(12) United States Patent
Hilpert et al.

(10) Patent No.: US 7,159,723 B2
(45) Date of Patent: Jan. 9, 2007

(54) CYCLONE SEPARATOR

(75) Inventors: Torsten Hilpert, Erdmannhausen (DE); Pius Trautmann, Stuttgart (DE)

(73) Assignee: Mann & Hummel GmbH, Ludwigsburg (DE)

( * ) Notice: Subject to any disclaimer, the term of this patent is extended or adjusted under 35 U.S.C. 154(b) by 196 days.

(21) Appl. No.: 10/703,158

(22) Filed: Nov. 7, 2003

(65) Prior Publication Data

US 2004/0144698 A1    Jul. 29, 2004

(51) Int. Cl.
*B04B 5/10* (2006.01)

(52) U.S. Cl. ............ 209/710; 209/711; 209/712; 209/728; 209/729

(58) Field of Classification Search ........... 209/713, 209/712, 710, 711, 728, 729; 55/406
See application file for complete search history.

(56) References Cited

U.S. PATENT DOCUMENTS 1,890,070 A    12/1932    Whiton, Jr.
3,667,196 A *   6/1972   Koenecke ............... 55/312
3,708,961 A *   1/1973   Kimmel, III ............ 96/372
3,767,045 A *  10/1973   Voelskow .............. 209/710
5,405,420 A *   4/1995   Yang .................... 96/372
6,152,310 A *  11/2000   Sakai et al. ........... 209/712

FOREIGN PATENT DOCUMENTS

DE       19729439      1/1998
GB        2284165      5/1995
WO     WO 01/92690   12/2001

OTHER PUBLICATIONS

European Search Report dated Oct. 27, 2005.

* cited by examiner

*Primary Examiner*—Kathy Matecki
*Assistant Examiner*—Terrell Matthews
(74) *Attorney, Agent, or Firm*—Crowell & Moring LLP

(57) ABSTRACT

A cyclone separator including an initial cyclone arrangement (1) arranged first in relation to a flow direction (18) through the separator; a second cyclone arrangement (2) connected in series with the initial cyclone arrangement; a bypass channel (3) bypassing the second cyclone arrangement (2), and a volumetric flow controlled valve device (4) for selectively directing a partial stream (5) through the bypass channel (3).

11 Claims, 2 Drawing Sheets

CYCLONE SEPARATOR

BACKGROUND OF THE INVENTION

The invention relates to a cyclone separator comprising first and second cyclone arrangements connected in series.

Cyclone separators having a known type of construction are used in many devices for removing impurities from a gas stream. Such impurities can be dust particles, droplets of a liquid or the like. In particular, it is well known to arrange a cyclone separator in a crankcase ventilation system of an internal combustion engine. So-called blow-by gases are conveyed via the crankcase ventilation system to the air intake tract of the internal combustion engine. It is desirable to remove oil droplets entrained in the gas stream as completely as possible.

To separate entrained contaminants, the gas stream is directed approximately tangentially into a cyclone with an approximately round cross section. This causes a rapidly moving eddy to form. The centrifugal forces acting on the entrained contaminants cause these impurities to be deposited against the cyclone wall. Contaminants separated in this way can be removed from the lower area of the cyclone, e.g., with the aid of gravity. The resulting cleaned gas stream is discharged from the cyclone in the area near the cyclone axis.

In many applications, particularly in a crankcase ventilation system, the requirements to be met with respect to the cleaning efficiency of the cyclone separator are high. To increase their efficiency, it is known to connect cyclone separators in series in the manner of a cascade, such that the gas is pre-cleaned in an initial cyclone arrangement, which is arranged first in relation to the flow direction through the separator, and further cleaned in one or more downstream cyclones. Such multi-stage cyclone separators can be designed to function within a specific operating range as regards their cleaning action and flow resistance indicated by the pressure loss as the gas flows through them. However, it is difficult to design a cyclone separator suitable for cleaning gas streams across a broad range of volume flow rates. If the cyclone separator is adapted to the maximum volume flow that occurs, the cleaning action may be insufficient at lower volume flows. On the other hand, if the cyclone separator is adapted to, for example, an average volume flow, then the flow resistance may become excessively high at a maximum volume flow.

SUMMARY OF THE INVENTION

It is an object of the present invention to provide an improved cyclone separator arrangement.

Another object of the invention is to provide a cyclone separator arrangement which exhibits a good separating action at low flow resistance over a broad operating range.

These and other objects are achieved in accordance with the present invention by providing a cyclone separator comprising a cyclone separator comprising an initial cyclone arrangement arranged first in a flow direction; a second cyclone arrangement connected in series with said initial arrangement, a bypass channel for bypassing the second cyclone arrangement, and a volumetric flow controlled valve device for defining a partial stream that can be directed through the bypass channel.

The cyclone separator according to the invention comprises a first and a second cyclone arrangement connected in series. It has a bypass channel bypassing the second cyclone arrangement and a volumetric-flow-controlled valve device to determine the partial stream that can be directed through the bypass channel. The proposed arrangement can be adapted to a smaller or average volume flow to be cleaned by essentially guiding the gas stream sequentially through the two cyclone arrangements with a correspondingly good cleaning action. In this case, the valve device closes the bypass channel completely or at least partially such that no, or at most a small, partial stream of the gas to be cleaned is guided through the bypass channel.

With increasing volume flow, a partial stream is switchably or functionally incrementally guided through the bypass channel. By bypassing the second cyclone arrangement, the flow resistance of the partial stream in the bypass channel is reduced. As a result, as the volume flow increases, the total flow resistance of the cyclone separator increases only to a minor extent.

The loss in cleaning action as a result of bypassing at least partially the second cyclone arrangement is offset, however, or even overcompensated, because the total volume flow directed through the first cyclone arrangement results in a better separating action due to the increase in the flow rate. This reliably prevents an undesirable, excessive increase in the flow resistance with increasing total volume flow and at the same time ensures a good separating action over a broad range of occurring volume flows.

In an advantageous further refinement, a gate pivotable about a pivot pin to control the valve device is disposed in a main flow channel connecting the first cyclone arrangement with the second cyclone arrangement. Such a pivotable gate is mechanically simple in its design. The volume flow dependent pivoting of the gate can be used reliably and with simple means to actuate the valve device.

Advantageously, the gate is configured in such a way that, when it is not actuated, a cross-sectional area not covered by the gate remains free in the main flow channel, particularly between at least one wall of the main flow channel and the gate. By appropriately dimensioning this free cross-sectional area and suitably configuring the gate or the valve device, at least small or medium volume flows can be directed through the free cross-sectional area without the gate having to execute a pivoting motion. This is a simple way to assure that the valve device directs a partial stream through the bypass channel only above a predefined volume flow. This ensures by simple means that small or medium volume flows are directed at least approximately completely through the two successive cyclone arrangements to achieve the corresponding separating action.

In one advantageous embodiment, the gate has an approximately rectangular configuration, and the main flow channel, in the area of the gate, has an angular cross section on one side and a rounded cross section on the opposite side. The pivot pin is arranged near the wall on the angular side of the cross section. By arranging the pivot pin near the wall in the area of the angular side of the cross section, the gate can be pivoted freely, while the rounded side of the cross section contributes to a low flow resistance overall. Because of its rectangular plan, the gate is easy to manufacture. At the same time, its different geometric shape relative to the cross-sectional shape of the main flow channel leaves one or more desired cross-sectional areas free.

To prevent a partial stream from flowing through the bypass channel below a predefined total volume flow, the valve device is advantageously configured in such a way that it acts as a seal in the bypass channel when it is not actuated. The valve device advantageously has one pivotable valve flap that regulates the free cross-sectional area of the bypass channel. This enables a simple, largely trouble-free mechanical construction. It also makes it possible optionally to design the valve device as a switching element or as a control element adjustable to any number of intermediate positions between a closed and a fully open position. Almost any desired control characteristic can be achieved by adjusting geometric specifications alone.

To obtain a simple configuration of the cyclone separator in the area of the valve device, it is proposed to provide the bypass channel with a rectangular cross section in the area of the valve flap and the valve flap with a matching rectangular configuration. The rectangular shape facilitates manufacture and, in addition to an unimpeded pivotability of the valve flap, enables reliable sealing of the bypass channel.

To further simplify the construction while assuring a reliable action, the valve flap and the gate are advantageously designed to be pivotable about a common pivot pin and, in particular, are constructed as an integral component. This avoids the need for additional transmission elements, such as control rods or the like, and assures reliable performance with low production and assembly costs.

The plan area or cross-sectional area of the gate is advantageously smaller than that of the valve flap. As a result, when the gate and the valve flap are partially or completely pivoted in the direction of their open position, the partial stream directed into the bypass channel is subject to some, at most minor, interference, which is of no great consequence depending on the geometric conditions.

A well balanced arrangement with respect to the separating action and flow resistance is one in which the first cyclone arrangement comprises two cyclones connected in parallel and the second cyclone arrangement has only one cyclone.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
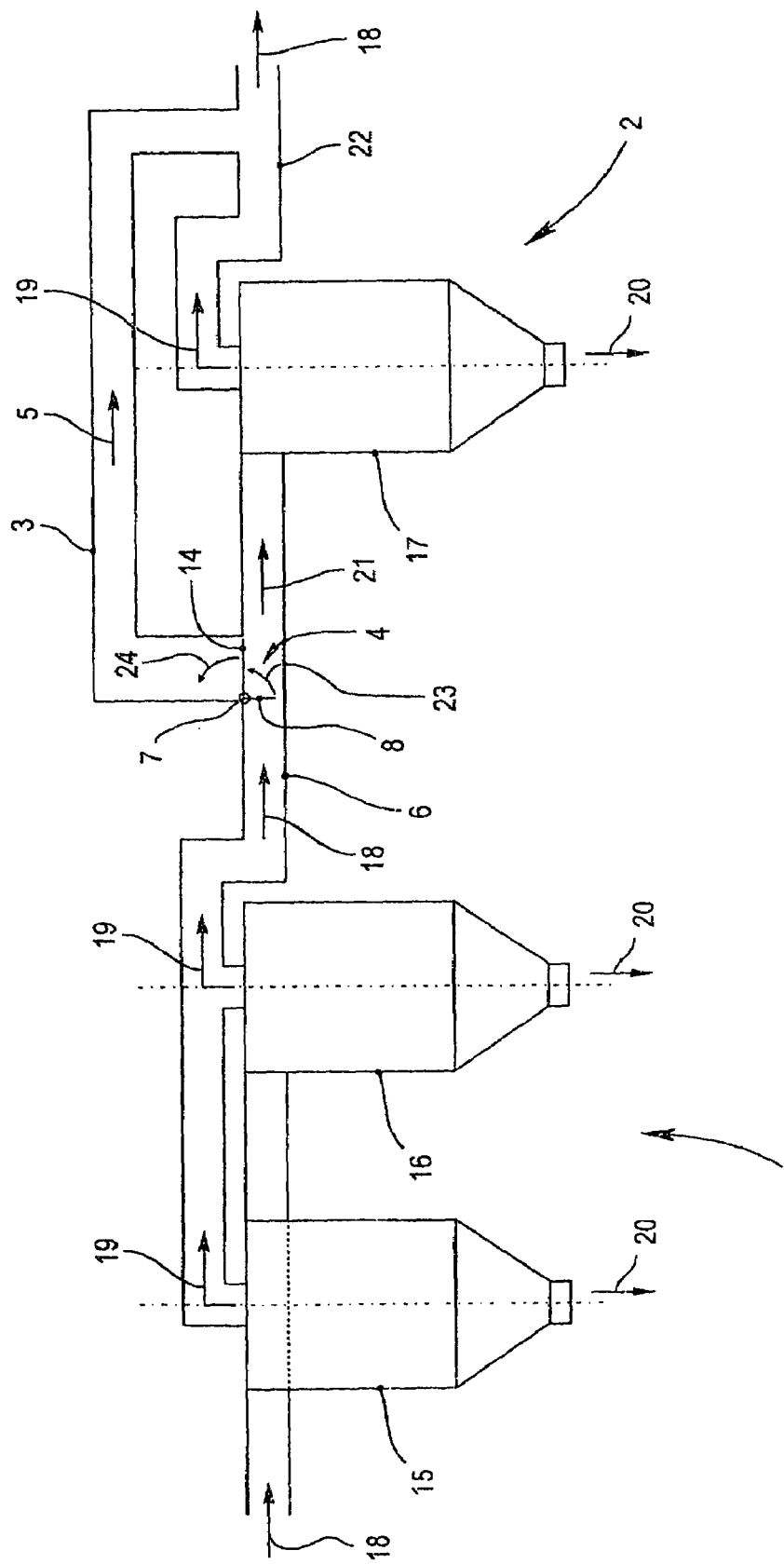
FIG. 1 is a schematic illustration of a cyclone separator comprising a first cyclone arrangement with two cyclones connected in parallel, and a second cyclone arrangement which can be bypassed by means of a bypass channel.

FIG. 1 is a schematic of a cyclone separator with a first cyclone arrangement 1 and a second cyclone arrangement 2. The gas flows through the cyclone arrangement 1 in the flow direction indicated by arrows 18. In relation to the flow direction 18, the second cyclone arrangement 2 is connected in series to the first cyclone arrangement 1.

A total of three cyclones 15, 16, 17 having approximately the same configuration are provided. The initial cyclone arrangement 1 includes the two cyclones 15, 16, which are connected in parallel. The second cyclone arrangement 2 includes only a single cyclone 17. It may also be advantageous to provide the cyclone arrangements 1 and 2 with only a single cyclone each or with any other number of cyclones 15, 16, 17. The cyclones 15, 16, 17 can also differ from one another with respect to their size and configuration.

The gas stream with the entrained impurities flows into the area of the initial cyclone arrangement on the inflow side and is introduced in parallel approximately tangentially into the two cyclones 15, 16 such that a swirling motion producing a centrifugal force arises in the two cyclones 15, 16. The contaminants deposited as a result of the centrifugal force are discharged from the bottom of the cyclones 15, 16 as indicated by arrows 20. At the tops of the cyclones 15, 16, opposite the arrows 20, partial gas streams pre-cleaned in the initial cyclone arrangement 1 are discharged in the direction of the arrows 19 and are combined in a main flow channel 6.

The initial and second cyclone arrangements 1 and 2 are interconnected in terms of flow by the main flow channel 6 such that a series connection results. With respect to its action, features and reference numerals, the cyclone 17 of the second cyclone arrangement 2 corresponds to the cyclones 15, 16 of the initial cyclone arrangement 1. The second cyclone arrangement 2 further purifies the gas stream that was pre-cleaned in the initial cyclone arrangement 1. The cleaned gas stream is discharged through an outlet channel 22.

The illustrated arrangement has a bypass channel 3, one end of which connects to the main flow channel 6 and the other end to the outlet channel 22. The bypass channel 3 bypasses the second cyclone arrangement 2 in a parallel connection. If desired, the gas stream flowing in flow direction 18 through the main flow channel 6 optionally can be divided into a main stream flowing to the second cyclone arrangement 2 and a parallel partial stream 5 flowing through the bypass channel. For this purpose, a volumetric flow controlled valve device 4 for determining the partial stream 5 that is to be directed through the bypass channel 3 is provided in the area where the bypass channel 3 connects to the main flow channel 6.

In the illustrated embodiment, the valve device 4 has a gate 8 projecting into the cross section of the main flow channel 6 and, at an angle thereto, a valve flap 14 covering the cross-section of the bypass line 3. In this embodiment, the gate 8 and the valve flap 14 are constructed as an integral component and can be pivoted from their standby position about a common pivot pin 7 in the direction of the arrows 23, 24. The pivoting motion of the depicted valve device 4 is determined by the volume flow in the main flow channel 6 upstream of the valve device 4 using the impact pressure acting on the gate 8. The pivoting motion can occur, for example, against a restoring spring force or against a resetting torque resulting from the weight of the valve device 4.

As the volume flow in the main flow channel 6 increases, the valve device 4 is increasingly pivoted in the direction of the arrows 23, 24. As a result, the partial stream 5 also increases and the main stream 21 correspondingly decreases. If the valve device 4 is fully open, a proportional main stream 21 remains, as shown in the illustrated embodiment. It may also be advantageous, however, to have a configuration in which the main stream 21 is at least approximately completely blocked, such that the entire gas stream flowing through the cyclone separator is conducted through the bypass line 3 as a partial stream 5 bypassing the second cyclone arrangement 2. It may further be provided that the valve device 4 executes a volumetric flow controlled switching motion when a predefined limit of the volume flow is reached, such that the bypass channel 3 is correspondingly unblocked.

Depending on the application, it may also be advantageous, however, to make the gate 8 or another suitable volumetric flow controlled control element separate from the valve device 4. In this case, the valve device 4 can be disposed at any other location in the bypass channel 3. A mechanical coupling, e.g., via control rods or cam plates, or any other, e.g., electrical, coupling between the gate 8 and the valve device 4 can be used for this purpose. The arrangement shown is intended for a crankcase ventilation system of an internal combustion engine for separating oil constituents from the blow-by gases. In this case, it may be advantageous if the bypass line 3, instead of opening into the outlet channel 22, leads directly to an intake port of the internal combustion engine. The arrangement shown can also be used to clean gas streams in any other type of application.

Figure 2:
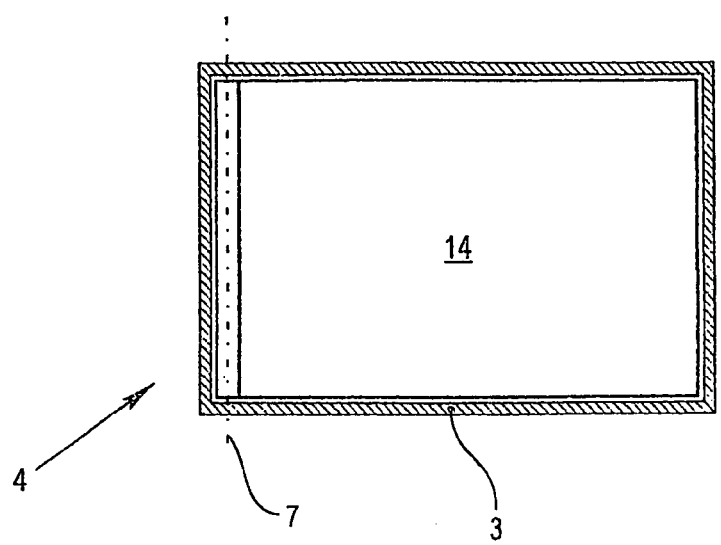
FIG. 2 is a schematic cross-sectional view of the bypass channel according to FIG. 1 in the area of the valve flap.

FIG. 2 is a schematic cross section of the bypass line 3 of the arrangement depicted in FIG. 1 in the area of the valve flap 14. In the embodiment shown, the valve flap 14 has a rectangular configuration and the bypass channel 3 in this area has a matching rectangular cross section. In the depicted standby position of the valve flap 14, the valve flap acts as a seal in the bypass channel 3. Pivoting the valve flap 14 about the pivot pin 7 in the direction of the arrow 24 (FIG. 1) controls the free cross-section in the bypass channel 3. It is also possible to provide a valve device 4 that enables a free cross-sectional area in the bypass channel 3 even when it is not actuated and thus allows at least a small partial stream 5 (FIG. 1) in the bypass channel 3.

Figure 3:
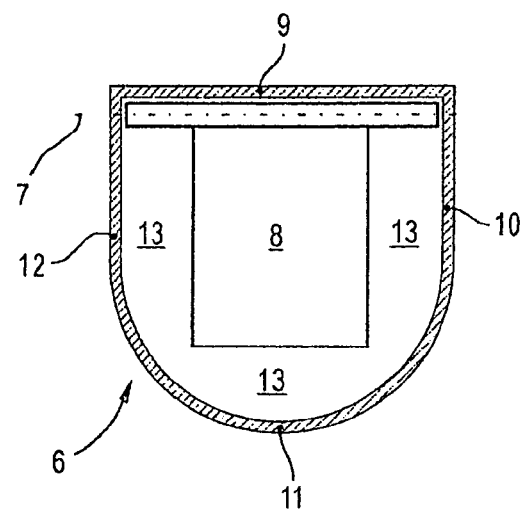
FIG. 3 is a schematic cross-sectional view of the main flow channel of the arrangement depicted in FIG. 1 in the area of the gate with a partially angular and partially rounded cross section.

FIG. 3 is a schematic cross-sectional view of the main flow channel 6 shown in FIG. 1 in the area of the gate 8. The main flow channel 6 is formed by walls 9, 10, 11, 12 and has a rectangular cross section in the area of the walls 9, 10, 12. On the opposite side, in the area of the wall 11, the cross section of the bypass channel is rounded. The pivot pin 7 is disposed near the wall 9 on the angular side of the cross section. The gate 8 has an approximately rectangular configuration, such that a free cross-sectional area 13 that is not covered by the gate 8 remains between the gate 8 and the walls 10, 11, 12 when the gate is not actuated. A configuration of the gate 8 in which the gate fully covers the cross-section of the main flow channel 6 when it is not actuated may also be advantageous, however.

The gate 8, and optionally the valve flap 14 if coupled therewith (FIG. 2), is/are actuated even at low volume flows through the main flow channel 6. In the embodiment shown, the cross-sectional area of the gate 8 is substantially smaller than the cross-sectional area of the valve flap 14 (FIG. 2).

Figure 4:
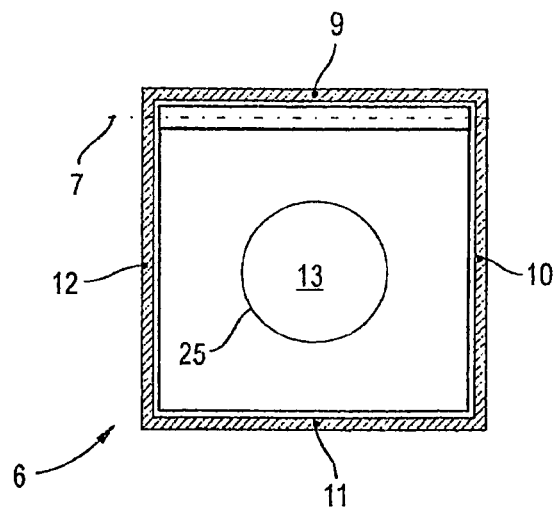
FIG. 4 depicts a variant of the cross-sectional configuration shown in FIG. 3 with a square cross section and a perforated gate.

FIG. 4 shows a variant of the arrangement according to FIG. 3 in which the walls 9, 10, 11, 12 form a rectangular, here approximately square, cross section of the main flow channel 6. The gate 8, in the depicted non-actuated state, fills the cross section of the main flow channel 6 with its outer contour. This leaves a free cross-sectional area 13 that is not covered by the gate 8 in the form of an opening 25, e.g., circular in this case, in the gate 8.

In the embodiments shown, the gate 8 is configured as an approximately flat plate. To adjust its control characteristic, e.g., by increasing or decreasing its flow resistance, the gate 8 can have an aerodynamically adapted shape. It may also be advantageous to arrange aerodynamic guide surfaces or to configure the gate 8 as an aerodynamic guide surface.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A cyclone separator comprising an initial cyclone arrangement arranged first in a flow direction; a second cyclone arrangement connected in series with said initial arrangement, a bypass channel for bypassing the second cyclone arrangement, and a volumetric flow controlled valve device for defining a partial stream that can be directed through the bypass channel wherein the valve device is controlled by a gate pivotable about a pivot pin arranged in a main flow channel connecting the first and second cyclone arrangements, and in the non-actuated state of the gate, a free cross-sectional area that is not covered by the gate remains in the main flow channel.

2. A cyclone separator according to claim 1, wherein said free cross-sectional area is between at least one wall of said main flow channel and the gate.

3. A cyclone separator according to claim 1, wherein the gate has an approximately rectangular configuration; the main flow channel adjacent the gate has an angular cross section on one side and a rounded cross section on an opposite side, and the pivot pin is disposed near a wall of the main channel on the angular side of the cross section.

4. A cyclone separator according to claim 1, wherein the valve device in its non-actuated state acts as a seal in the bypass channel.

5. A cyclone separator according to claim 4, wherein the bypass channel has a rectangular cross section adjacent the valve flap, and the valve flap has a matching rectangular configuration.

6. A cyclone separator according to claim 1, wherein the valve device comprises a pivotable valve flap which regulates a free cross section of the bypass channel.

7. A cyclone separator according to claim 6, wherein the bypass channel has a rectangular cross section adjacent the valve flap, and the valve flap has a matching rectangular configuration.

8. A cyclone separator according to claim 5, wherein the valve flap and the gate are jointly pivotable about the pivot pin.

9. A cyclone separator according to claim 8, wherein the valve flap and the gate are constructed as an integral component.

10. A cyclone separator according to claim 8, wherein the gate has a cross-sectional area less than or equal to that of the valve flap.

11. A cyclone separator according to claim 1, wherein the initial cyclone arrangement comprises two cyclones connected in parallel, and the second cyclone arrangement comprises a single cyclone.

* * * * *